US012738745B2

(12) United States Patent
Martin et al.

(10) Patent No.: US 12,738,745 B2
(45) Date of Patent: Sep. 15, 2026

(54) METHODS AND SYSTEMS TO PROVIDE ELECTRIC POWER FROM SOLAR ENERGY EQUIPMENT

(71) Applicant: SHELL USA, INC., Houston, TX (US)

(72) Inventors: Jeffrey Brendan Martin, Amsterdam (NL); Martijn Lunshof, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 35 days.

(21) Appl. No.: 18/866,985

(22) PCT Filed: May 16, 2023

(86) PCT No.: PCT/EP2023/063096
§ 371 (c)(1),
(2) Date: Nov. 18, 2024

(87) PCT Pub. No.: WO2023/222676
PCT Pub. Date: Nov. 23, 2023

(65) Prior Publication Data

US 2025/0202238 A1 Jun. 19, 2025

(30) Foreign Application Priority Data

May 20, 2022 (EP) .................................... 22174460

(51) Int. Cl.
*H02J 3/38* (2026.01)
*C25B 9/65* (2021.01)
(Continued)

(52) U.S. Cl.
CPC .................. *H02J 3/38* (2013.01); *C25B 9/65* (2021.01); *C25B 9/70* (2021.01); *H02J 3/007* (2020.01);
(Continued)

(58) Field of Classification Search
CPC .. H02J 3/38; H02S 40/30; H02S 50/00; Y02E 10/56
See application file for complete search history.

(56) References Cited

U.S. PATENT DOCUMENTS 11,183,843 B1 * 11/2021 Cooper ................ H02J 3/0075
2005/0189234 A1 * 9/2005 Gibson ..................... C25B 1/04
205/337

(Continued)

FOREIGN PATENT DOCUMENTS

WO 2007142693 A2 12/2007

OTHER PUBLICATIONS

International Search Report and Written Opinion received for PCT Patent Application No. PCT/EP2023/063096, mailed on Aug. 7, 2023, 14 Pages.

*Primary Examiner* — Rexford N Barnie
*Assistant Examiner* — Joseph N Inge
(74) *Attorney, Agent, or Firm* — SHELL USA, INC.

(57) ABSTRACT

A method is provided for directly providing electrical power from a photovoltaic (PV) installation to electrical consumer. The method comprises (a) providing electrical power from the PV installation directly to the electrical consumer, where the PV installation comprises a first portion and a second portion; (b) determining whether current (I) output of the PV installation is below a threshold; and (c) if it is below the threshold, connecting at least one segment of the second portion of the PV installation to the electrical consumer; or (d) if it is determined that the current (I) output of the PV installation exceeds the threshold, disconnecting at least a connected segment of the second portion of the PV installation from the electrical consumer; and repeating steps (b) through (d) to maintain the current (I) output of the PV installation within a range of the threshold.

20 Claims, 8 Drawing Sheets

(51) Int. Cl.

| | |
|---|---|
| ***C25B 9/70*** | (2021.01) |
| ***H02J 3/007*** | (2026.01) |
| ***H02J 101/24*** | (2026.01) |
| ***H02S 40/30*** | (2014.01) |
| ***H02S 50/00*** | (2014.01) |

(52) U.S. Cl.

CPC .............. *H02S 40/30* (2014.12); *H02S 50/00* (2013.01); *H02J 2101/24* (2026.01)

(56) References Cited

U.S. PATENT DOCUMENTS

| | | | | |
|---|---|---|---|---|
| 2008/0236647 | A1* | 10/2008 | Gibson | C25B 1/04 136/244 |
| 2009/0178918 | A1 | 7/2009 | Gibson et al. | |
| 2011/0297204 | A1* | 12/2011 | Gibson | H02J 3/32 136/244 |
| 2013/0317959 | A1* | 11/2013 | Joos | C25B 1/04 205/637 |
| 2016/0281248 | A1* | 9/2016 | Hahn | C25B 9/70 |
| 2020/0119561 | A1* | 4/2020 | McMorrow | H02J 3/32 |
| 2021/0079544 | A1* | 3/2021 | Harikumaran | C25B 1/04 |

* cited by examiner

METHODS AND SYSTEMS TO PROVIDE ELECTRIC POWER FROM SOLAR ENERGY EQUIPMENT

CROSS REFERENCE TO RELATED APPLICATIONS

This is a National stage application of International Application No. PCT/EP2023/063096, filed 16 May 2023, which claims priority of European Application No. 22174460.0 filed 20 May 2022 which is incorporated herein by reference in its entirety.

FIELD OF THE INVENTION

The present invention relates to methods and systems to provide electric power generated by solar energy equipment to an electrical consumer.

BACKGROUND OF THE INVENTION

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of any prior art.

The characteristics of electric power from solar energy equipment, such as PV panels, can vary throughout the day, particularly due to the intermittent nature of such sources. The intermittency and other factors have presented challenges to directly interconnect PV panels with electrical loads, particularly largescale electrical loads, such as those with rated power consumption in the gigawatt(s) range, particularly electrolysis equipment, which produces "green" hydrogen by splitting water into hydrogen and oxygen when fed by "green" electricity. Green hydrogen has garnered increasing interest in efforts to decarbonize global energy consumption. This is partly because hydrogen is a molecule of key interest for the future energy transition, either as a commercial fuel for automotive fuel cell applications, or as a carrier to move renewable energy over long distances.

The properties of electric power from solar (such as current and voltage) can vary throughout the day, particularly due to the intermittent nature of such sources. As such, solar equipment is typically connected to a utility power grid as an intermediary for wider distribution of the green energy to the general population served by that utility power grid rather than such green energy being transmitted directly from the solar equipment to one or more electrical consumers, particularly ones with energy demands in the gigawatt range.

Nevertheless, there are systems and methods that couple electrolysis equipment directly to PV panels or arrays without going through a utility grid because of the potential of high efficiency conversion of solar energy to hydrogen. That is, the relative amount of electric power that is used to split water molecules and generate hydrogen using a direct connection between an electrolyzer and PV arrays is less than if electricity used to generate hydrogen is from a utility grid due to reactive power loss through the grid infrastructure. It is understood that the efficiency from a direct electrical connection with PV arrays apply similarly to other electrical consumers, not just electrolyzers.

For instance, US20210079544 discloses an electrolysis system typically has a photovoltaic array for providing current and voltage output, and an electrolyser arrangement having at least one electrolyser stack directly connected to the photovoltaic array.

US2011297204 discloses selectively connecting a portion of a PV array having a maximum power point voltage matching the operating voltage of the process and selectively connecting a second portion of the PV array having a maximum power point voltage matching the operating voltage of the at least a second process.

WO2007142693 discloses a process that continually monitors and controls by an automatic controller system to operate the PV and electrolyzer systems at or near their respective maximum efficiencies. WO2007142693 also provides that an insertion of a DC-DC converter, rather than a direct connection, may be used to adjust the Vmpp to the operating voltage of the electrolyzer.

US2005189234 and US20090178918 both generally disclose matching of the most efficient voltage generated by photovoltaic cells to the most efficient input voltage required by the electrolysis cell(s), which can be economically challenging to implement at larger scales.

The references noted above primarily focus on efficiency of the operation of the electrical consumer, such as intending to use the least amount of solar electricity that may have been most efficiently generated by the solar equipment to generate the most hydrogen for that amount of solar electricity. They do not contemplate any solutions to the lack of economy issue associated with the electrical consumer having an overall lower output when directly connected to solar equipment due to the intermittent characteristics of the power production.

For instance, US20080236647 attempts to address the lack of economy of directly connecting to PV arrays alone, despite the high efficiency, by additionally connecting the electrolysis equipment to a utility grid as a second source of electricity.

Therefore, other solutions are needed to increase the electric power provided to electrical consumers when directly connected to solar equipment.

US20200119561A1 discloses solar power generations systems, or more particularly to DC integration of batteries for expanding the DC-AC ratio limit of a PV inverter.

SUMMARY OF THE INVENTION

The methods and systems described herein enable electrical power to be provided directly from a PV installation to an electrical consumer, preferably electrolysis equipment to produce hydrogen from solar energy, where operation of the electrolysis equipment does not need to be powered by electrical power from an electrical utility grid. Moreover, the methods and systems described herein enable the hydrogen production to be maximized over efficiency at least by allowing additional current from the PV installation (which tends to fluctuate) to be provided for additional production while remaining around a desired threshold.

According to certain aspects, there is provided a method for directly providing electrical power from a photovoltaic (PV) installation to electrical consumer. The method comprises: (a) providing electrical power generated by a PV installation via a direct connection to an electrical consumer wherein the electrical consumer comprises a rated current and a rated power, and the electrical consumer preferably consists essentially of electrolysis equipment. The PV installation comprises a first portion and a second portion, where each of the first portion and the second portion comprises at least one PV string, where the first portion comprises a first maximum power production point of at least 60%, preferably in a range from 60% to 120%, and more preferably in a range of 60% to 100%, of the rated power of the electrical consumer. The second portion comprises a second maximum power production point such that the sum of the first and second maximum power production points is at least 5%, preferably in a range from 30% to 40%, and more preferably from 40% to 70%, greater than the rated power of the electrical consumer. The method further comprises (b) determining whether current (I) output of the PV installation is below a threshold; and (c) if it is determined that the current (I) output of the PV installation is below the threshold, connecting at least one segment of the second portion of the PV installation to the electrical consumer to allow any generated electrical power to be provided; or (d) if it is determined that the current (I) output of the PV installation exceeds the threshold, disconnecting at least a connected segment of the second portion of the PV installation from the electrical consumer to stop electrical power from being provided. The method further comprises (d) repeating steps (b) through (d) to maintain the current (I) output of the PV installation within a range of the threshold.

Optionally, the segment of the second portion of the PV installation being connected or disconnected is selected from the group consisting of a PV module, a PV string, a PV array, and any combination thereof. Optionally, each segment of the second portion being connected or disconnected has a current (I) capacity of 1%-15%, preferably 1%-5%, and more preferably 1%-2% of the total current (I) capacity of the PV installation.

Optionally, steps (c) and (d) comprise sending a signal to the switching mechanism to perform the respective connecting step or disconnecting step. Optionally, the switching mechanism is an electrical switching mechanism, preferably comprising one or more solid state relays (SSRs). Optionally, at least one switching mechanism is connected to each segment being connected or disconnected.

Optionally, the threshold is in a range from 95% to 110% of the rated current of the electrical consumer.

Optionally, the step of connecting at least a segment of the second portion comprises selectively connecting at least by:

(d1) determining whether all segments in the second portion are connected to the electrical consumer;

(d2) if it is determined that all segments in the second portion are connected to the electrical consumer, repeating steps (b)-(d); or (d3) if it is determined that not all segments in the second portion are connected to the electrical consumer, connecting at least a segment of the second portion to the electrical consumer.

Optionally, the selectively connecting further comprises:

(d3i) selecting a segment of the second portion to connect with the electrical consumer;

(d3ii) determining whether the selected segment is already connected to the electrical consumer;

(d3iii) if it is determined that the selected segment is already connected to the electrical consumer, selecting another segment of the second portion; or (d3iv) if it is determined that the selected segment is not connected to the electrical consumer, connecting the selected segment to the electrical consumer;

(d3v) repeating steps (d3i)-(d3iii) for all segments of the second portion; and (d3vi) repeating steps (b)-(d) after steps (d3i)-(d3iii) have been performed for all segments of the second portion.

Optionally, the step of disconnecting a connected segment of the second portion comprises selectively disconnecting at least by:

(e1) determining whether all segments in the second portion are disconnected from the electrical consumer;

(e2) if it is determined that all segments in the second portion are disconnected from the electrical consumer, repeating steps (b)-(d); or (e3) if it is determined that a segment of the second portion is connected to the electrical consumer, disconnecting the connected segment of the second portion from the electrical consumer.

Optionally, the selectively disconnecting further comprises:

(e3i) selecting a connected segment of the second portion to disconnect from the electrical consumer based on the amount of current being provided by that connected segment, preferably selecting either a segment of the second portion providing the lowest current or the highest current in comparison with other segments of the second portion to disconnect.

Optionally, the method comprises a delay period before step (b) is performed, preferably a delay period of at least 0.2 second, more preferably a delay period of at least 0.5 second, and most preferably a delay period of at least 1 second.

Optionally, wherein the electrical consumer comprises two or more sets of electrolysis equipment in parallel, where preferably each set of electrolysis equipment comprises one electrolyzer stack or two or more electrolyzer stacks connected in series.

Optionally, the PV installation has a nominal power output of at least 1 MW, preferably at least 5 MW, more preferably at least 10 MW, and most preferably at least 20 MW.

Optionally, the method further comprises estimating the available current of the PV installation, preferably wherein the estimating is based at least on a correlation with measured irradiance, and connecting the PV installation to the electrical consumer if the estimated available current is above a minimum operating current of the electrical consumer.

Optionally, the electrical consumer comprises electrolysis equipment and does not receive electrical power from an electrical grid to generate hydrogen.

DETAILED DESCRIPTION OF THE INVENTION

Figure 1:
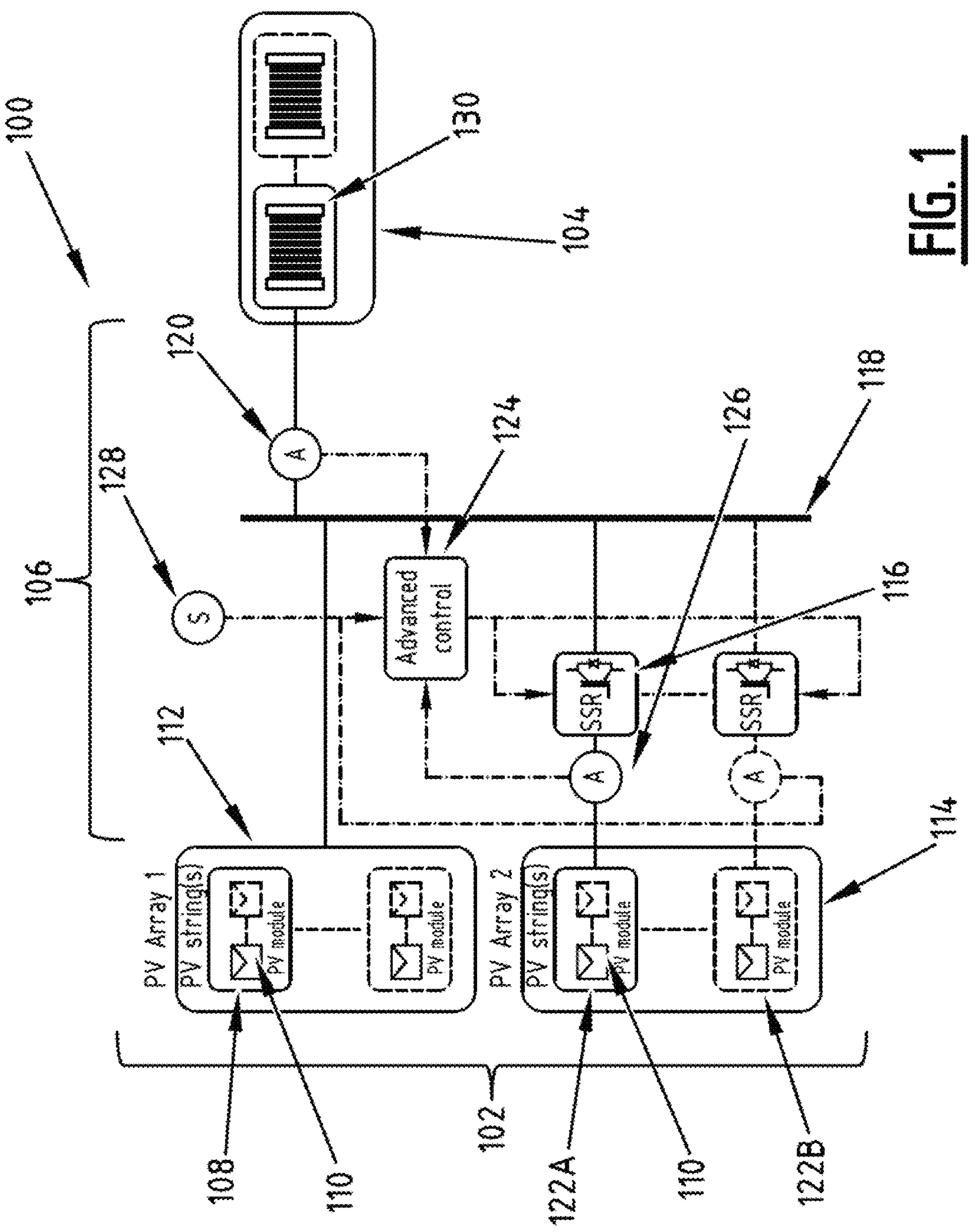
FIG. 1 illustrates one exemplary system of a PV installation directly connected to an electrical consumer, such as electrolysis equipment, which system can be operated according to aspects described herein, including the exemplary process flow depicted in FIG. 7 and corresponding descriptions.

The present invention will now be described in detail with reference to embodiments thereof as illustrated in the accompanying drawings. References to "one embodiment", "an embodiment" "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Other suitable modifications and adaptations of the variety of conditions and parameters normally encountered in the field, and which would be apparent to those skilled in the art, are within the spirit and scope of the invention.

Although the description herein provides numerous specific details that are set forth for a thorough understanding of illustrative embodiments, it will be apparent to one skilled in the art that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

In addition, when like elements are used in one or more figures, identical reference characters will be used in each figure, and a detailed description of the element will be provided only at its first occurrence. Some features or components of the systems or processes described herein may be omitted in certain depicted configurations in the interest of clarity. Moreover, certain features such as, but not limited to pumps, valves, gas bleeds, gas inlets, fluid inlets, fluid outlets and the like have not necessarily been depicted in the figures, but their presence and function will be understood by one having ordinary skill in the art. Similarly, the depiction of some of such features in the figures does not indicate that all of them are depicted.

For context, FIG. 1 shows one example of a system, such as system 100, that comprises PV installation 102, electrical consumer 104, and a direct connection 106 between the two to provide electrical power generated by PV installation 102 to electrolysis equipment 104. It is understood that the methods and systems described herein are particularly suitable for electrolysis equipment. Nevertheless, such described systems and methods can be applicable to other types of electrical consumers, as known to one of ordinary skill. The methods and systems described herein are applicable for system 100 and its various embodiments described herein.

As used herein, a "direct" connection between a PV installation with the connected electrical consumer has its ordinary meaning, which is a connection without any conversion equipment between the PV installation and the connected electrical consumer to change the current, voltage, and/or the current (direct vs. alternating) of the electrical power being provided. Such conversion equipment includes DC-DC converters, inverters, transformers and rectifiers. For instance, inverters generally function to invert direct current (DC) power into alternating current (AC) power; transformers as well as DC-DC converters transfer electricity from one circuit to another with changing voltage level but no frequency change; and rectifiers convert alternating current (AC), which periodically reverses direction, to direct current (DC). It is understood that a direct connection as used herein excludes circumstances where there is a utility-grid between the PV installation and the electrical consumer. This is because grid-connection, either to provide or receive electrical power, requires various types of conversion equipment to either transform the generated electrical power from the PV installation into an acceptable format by the grid or transform the electrical power from the grid to an acceptable format by the electrical consumer. While direct connection 106 between PV installation 102 and electrical consumer 104 does not include any conversion equipment, system 100 can comprise conversion equipment as applicable and known by one of ordinary skill. For instance, in an embodiment where electrical consumer 104 consists essentially of electrolysis equipment or system(s), the electrolyser stacks of such system(s) utilize direct current (DC) power to drive the electrochemical splitting of water to make hydrogen, and constitutes a significant amount of the total power demand. Electrolyser systems further include other power electronics (not shown), such as additional hardware required to support the operation of the electrolyser stack, commonly referred to as the balance of plant (BoP, not shown). Depending on the requirements of the BoP, it may optionally contain a rectifier (not shown), depending on the requirements of the BoP but such a rectifier, if present, is not part of direct connection 106.

Electrical consumer 104 has rated specifications, such as rated power, rated current, and rated voltage, typically provided by the manufacturer. As used herein, "rated" voltage, current, and power have their ordinary meaning, including the maximum voltage, current, and power, respectively, at which a component or device (electrical consumer) can be operated safely. Providing electricity with properties that go beyond the rated specifications of the consumer(s) risks damaging the electrical consumer (such as electrolysis equipment) and/or disrupting operations (such as power surges, etc.).

The fluctuating current and voltage of electrical power generated by a PV installation is a factor to consider in ensuring compliance with the rated specifications of the electrolysis equipment. For direct connections that do not employ conversion equipment to regulate the current and voltage to meet the rated specifications of the electrical consumer, this issue is typically addressed by configuring the PV installation in a way such that its maximum production level does not exceed a certain threshold, typically a rated specification of the consumer, such as rated current, voltage, or power. Doing so generally results in the PV installation being "undersized" with respect to the electrical consumer, where the electrical consumer can be operated for longer periods of time (such as to generate more hydrogen), but the limiting factor is the "undersized" amount of electrical power being provided.

Figure 2:
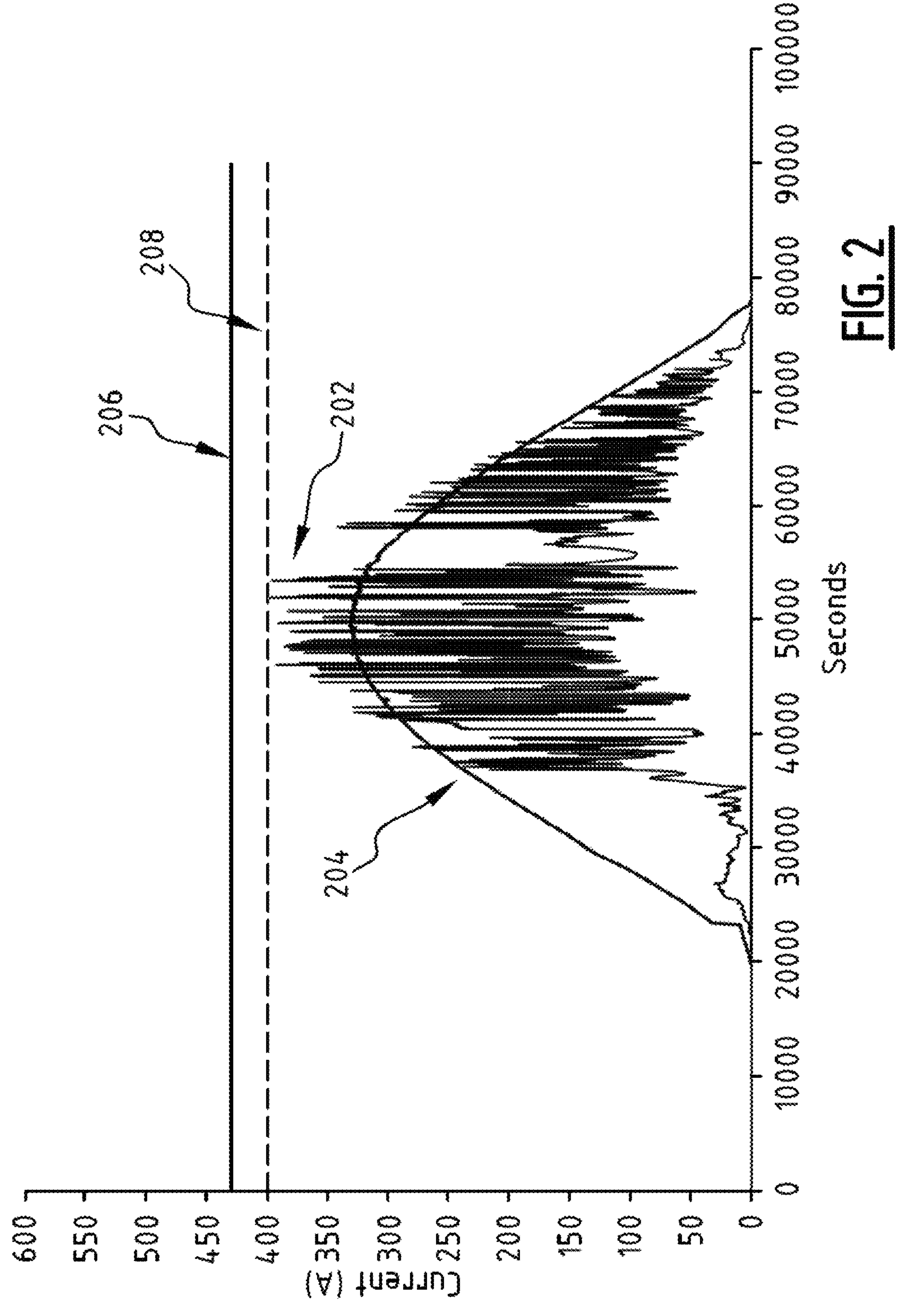
FIG. 2 is an exemplary graph of electrical current production by an exemplary under-sized PV installation on a sunny day and a cloudy day.

For instance, FIG. 2 shows a graph of the current output in amps (A) on the y-axis from the PV installation (such as PV installation 102 in FIG. 1) vs. time (seconds). When the electrical consumer (e.g., 104) connected to the PV installation generating the graph in FIG. 2 consists essentially of electrolysis equipment, then the graph in FIG. 2 can be indicative of the hydrogen production by such connected electrolysis equipment because of the linear correlation between current output and hydrogen production (i.e., increase in current (I) input equals increase in hydrogen production). In FIG. 2, 202 shows the maximum current estimated to be generated by the PV installation of this graph throughout a half-sunny day with scattered white clouds, and 204 shows the maximum current estimated to be generated on a sunny day without clouds. As can be seen, to ensure that the maximum current generated at any given moment does not exceed the threshold 206 (maximum allowable current, which typically is based on the rated current of the connected electrical consumer), the PV installation can be designed (based on their nominal capacity as provided by the manufacturer and determining the maximum production current of the PV modules arrangement based on weather conditions of the selected location) such that the peak of its curves 202 and 204 are below the normal 100% operating current as suggested by the manufacturer of the electrolysis equipment, which is below threshold 206. Manufacturers of electrolysis equipment typically provide various operating parameters, such as normal 100% operating current referenced and maximum allowable current before a warning is triggered, which one of ordinary skill can consider in selecting threshold 206 as desired. That is, while threshold 206 is preferably selected based on the maximum allowable current pursuant to the equipment manufacturer to maximize hydrogen production, threshold 206 can be selected based on any other current (I) amount to meet desired objectives as known to one of ordinary skill. As used herein, "nominal capacity" has its ordinary meaning, including the intended full-load sustained output of a system or component, if the context refers to an electrical source. Also, nominal capacity is the number registered with authorities for classifying the power output of an electrical source. It is understood by one of ordinary skill that the PV modules can be arranged in parallel, in series, or any combination thereof to achieve the desired output current and voltage particular to the weather condition of a certain location. For instance, the PV installation having the current profiles shown in FIG. 2 can be PV installation 102 in FIG. 1 in which PV string 108 can comprise one or more PV modules 110. If PV string 108 has two or more PV modules 110, then these PV modules 110 are connected in series. A plurality of PV strings 108 can be connected in parallel to form a PV array (such as first portion 112, further described below).

Figure 3:
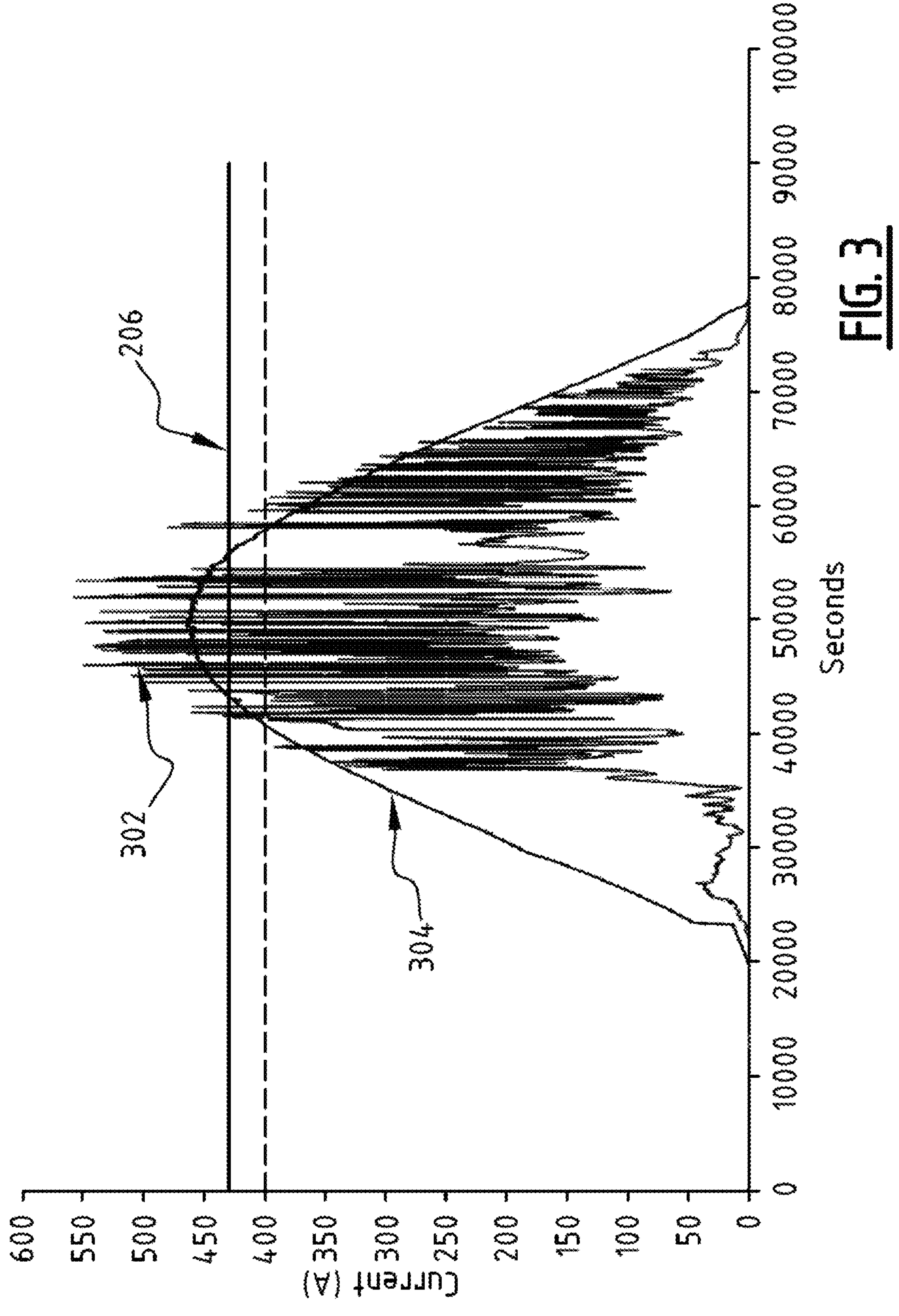
FIG. 3 is an exemplary graph of electrical current production by an exemplary oversized PV installation on a sunny day and a cloudy day.

The present methods and systems as described herein allow for providing additional current to the electrical consumer (such as 104) while still complying with the rated specifications of the consumer to minimize disruptions to operations or damages sustained by the consumer itself. The present methods and systems allow for connecting additional PV modules to increase the current from the PV installation toward threshold 206 and disconnecting PV modules to decrease current if threshold 206 is exceeded. As can be seen in FIG. 3, this can be achieved by sizing or configuring the PV installation to have current production curves (or profiles) on a half-sunny day with scattered clouds (302) and full-sunny day without clouds (304) with peaks that exceed threshold 206 to allow for the additional current to be provided, as depicted by curve 304, in contrast with the PV installation with the current profiles depicted in FIG. 2. Such a PV installation associated with FIG. 2 may be referred to as being "undersized" for the connected electrical consumer because the amount of current output on any given day (as represented by curves 202 and 204) is below threshold 206 (typically rated current of the connected electrical consumer). On the other hand, the PV installation of FIG. 3 may be referred to as being "oversized" because the peaks of current profiles 302 and 304 are above threshold 206.

Figure 4:
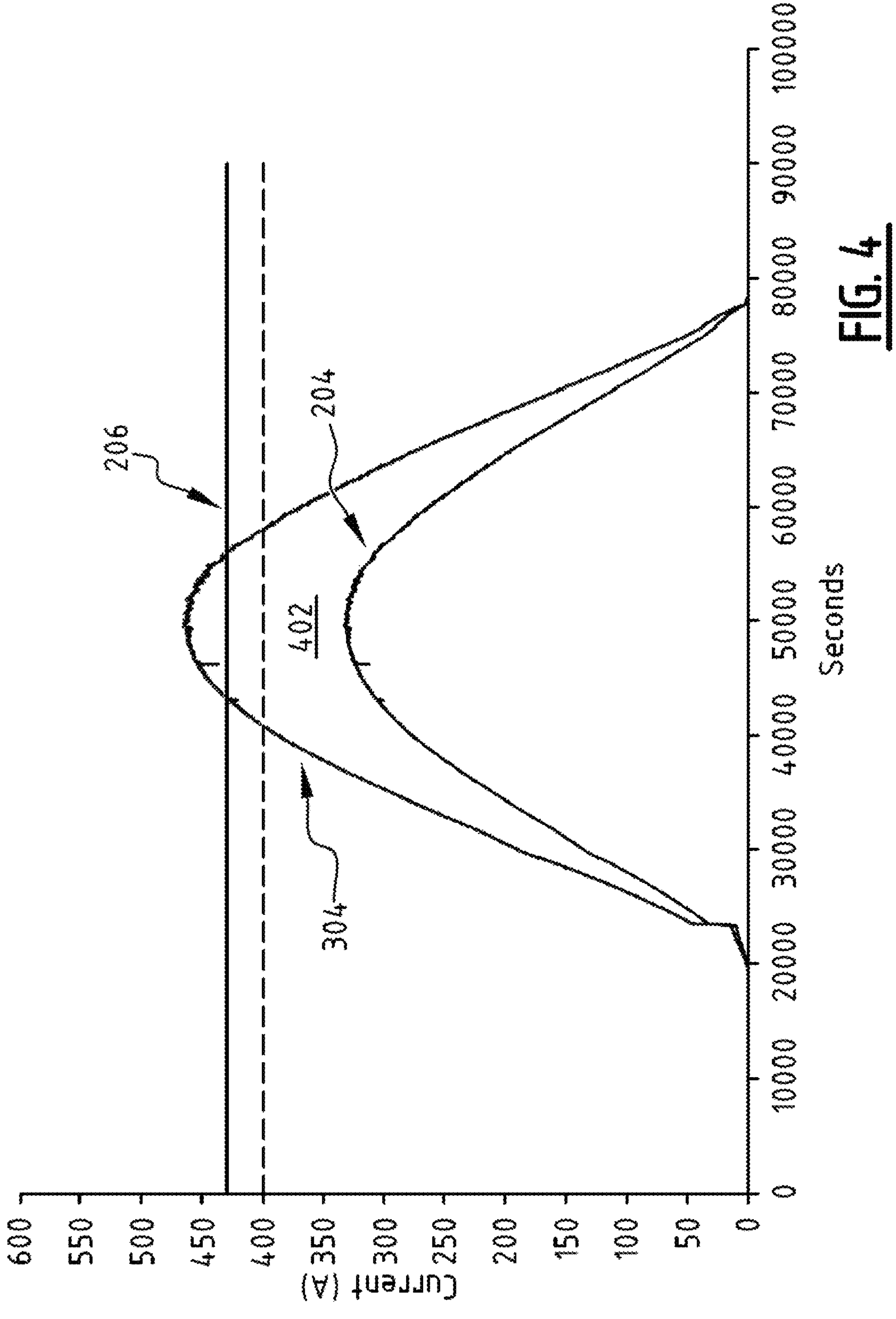
FIG. 4 is an exemplary graph illustrating the difference in electrical current production between FIG. 2 and FIG. 3.

The additional PV modules can be connected and disconnected in a controlled manner to ensure that threshold 206 is not exceed. The connecting and disconnecting of additional PV modules as described herein are preferably done selectively, the various exemplary embodiments of which are described herein. Having a second portion of PV modules (the additional PV modules) that can be connected and disconnected as described herein provides the benefits of increased current (I) available in an overall "oversized" PV installation while ensuring that the operating conditions of the connected electrical consumer are not exceeded. The additional current (I) made available by increasing the number of PV modules as described herein under the "oversized" configuration results in additional productivity for an electrical consumer, particularly resulting in hydrogen generation for connected electrolysis equipment due to the direct correlation of current (I) and hydrogen production. FIG. 4 compares the "undersized" current (I) production curve 204 on a sunny day to the "oversized" current (I) production curve under similar conditions 304, showing region 402 between the two curves under threshold 206 as an example of the available increase enabled by the methods and systems described herein. It is understood that the graphs are used to describe the concepts and features of the described methods and systems while the exact numbers may vary depending on the specifications particular to certain embodiments.

As known to one of ordinary skill, the intensity of the solar insolation that hits the PV module controls the current (I), while the increases in the temperature of the PV module reduces its voltage (V). A PV module or PV installation typically has its particular I-V curve, such as 502 and 504 in FIG. 5, that is a graphical representation of the current (I) and voltage relationship of that module or installation at certain operating conditions of irradiance and temperature. Curve 502 is for a PV installation with nominal current (I) output of about 425 Amps, and curve 504 is for a PV installation with nominal current (I) output of about 600 Amps. For both curves 502 and 504, with the respective PV installation open-circuited (i.e., not connected to any load), the current will be at its minimum (zero) and the voltage across that PV installation is at its maximum (i.e., around 160 V). At the other extreme, when the respective PV installation is short circuited (i.e., positive and negative leads connected together), the voltage across that PV installation is at its minimum (zero) but the current flowing out of the PV installation reaches its maximum (about 425 Amps for curve 502 and 600 amps for curve 504).

The power delivered by a PV installation is the product of its current (I) output and voltage output (P=I*V). If the multiplication is performed across the operating voltage from short-circuit to open-circuit conditions, a power curve can be generated for a given irradiance level, such as those in FIG. 6, power curves 602 and 604, corresponding to I-V curves 502 and 504, respectively. There is one particular combination of current and voltage for which the power reaches its maximum value (maximum power point or MPP), which is MPP 506 for I-V curve 502 and power curve 602 and MPP 508 for I-V curve 504 and power curve 604, in FIGS. 5 and 6, respectively. The MPP may be referred to as the ideal operation condition of a PV installation under certain weather conditions (temperature and irradiance). As such, I-V curves provide the information required to configure a PV installation so that it can operate as close to its MPP as possible.

Figure 5:
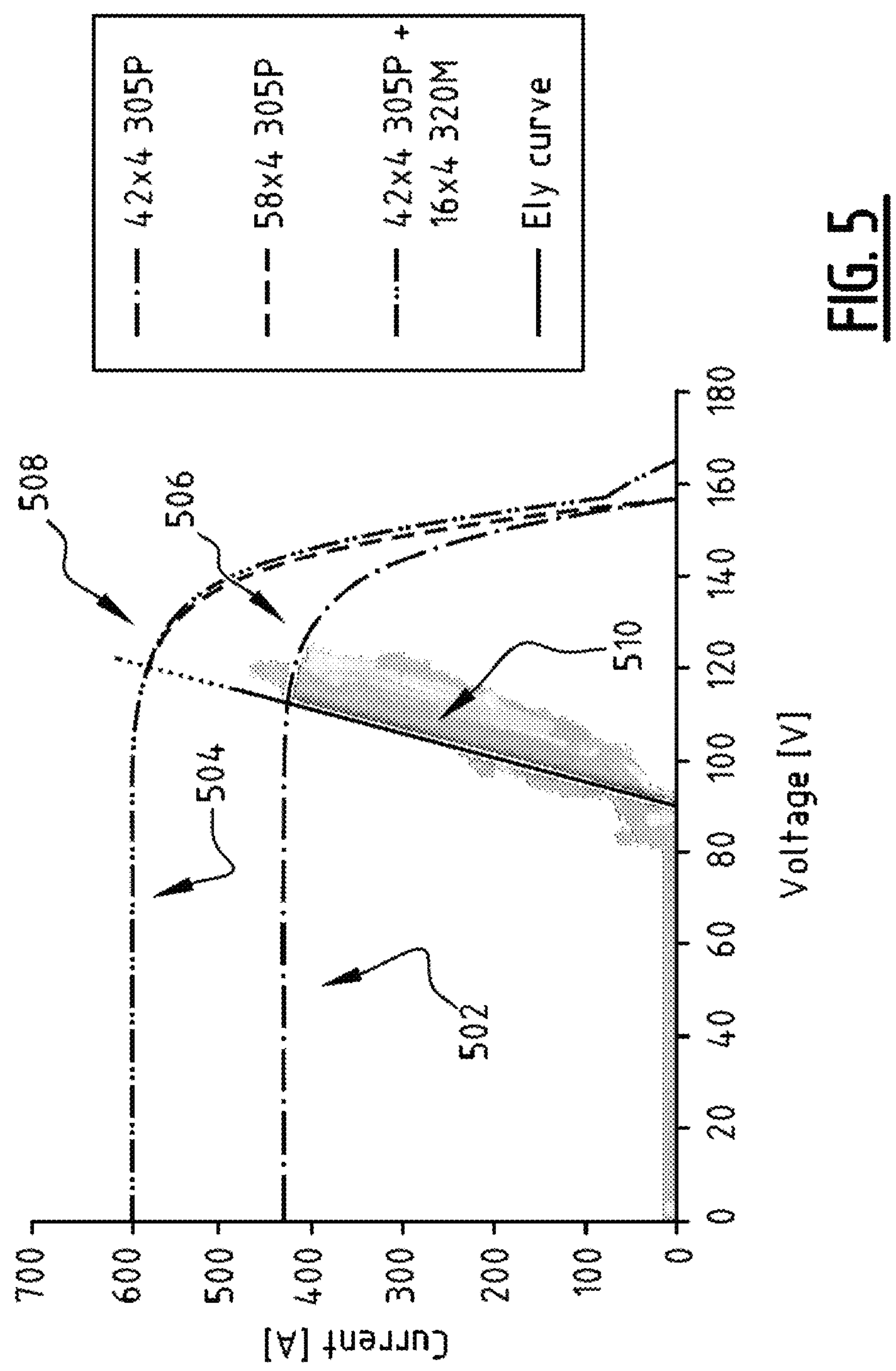
FIG. 5 is an exemplary graph depicting the Voltage/Current curve of the undersized PV installation of FIG. 2 and the oversized PV installation of FIG. 3.

For an electrical consumer that consists essentially of electrolysis equipment and directly connected to a PV installation, the electrolysis equipment has a polarization or I-V curve that defines the relationship between voltage and current (I) inputs to the electrolysis equipment, with the current (I) having a linear relationship to hydrogen generation (i.e., increase in current (I) input results in increase in hydrogen production). The I-V curves of a PV installation may be matched up to the polarization curve of the electrolysis equipment in designing a system, such as system 100 in FIG. 1. For instance, additional PV modules and/or electrolysis stacks may be added, or its sizing reconfigured to be within desired operating conditions and/or hydrogen production. FIG. 5 depicts one example of how polarization curve 510 of a certain electrolysis equipment may be matched up to the PV installation with I-V curve 502 and one with I-V curve 504.

In particular, I-V curve 502 is "undersized" relative to polarization curve 510 and I-V curve 504 is "oversized" relative to curve 510, under similar weather conditions. The descriptions related to "undersized" and "oversized" above and elsewhere are respectively applicable here. The oversized PV installation has about 40% (e.g., 38%) more electricity production capacity than the undersized PV installation. For example, the I-V curve 502 can be for a PV installation with a current (I) production capacity of about 425 Amps that remains relatively constant across a range of 0 to 120V, and the I-V curve 504 can be for a PV installation with a current (I) production capacity of about 600 Amps (roughly 40% more).

Figure 6:
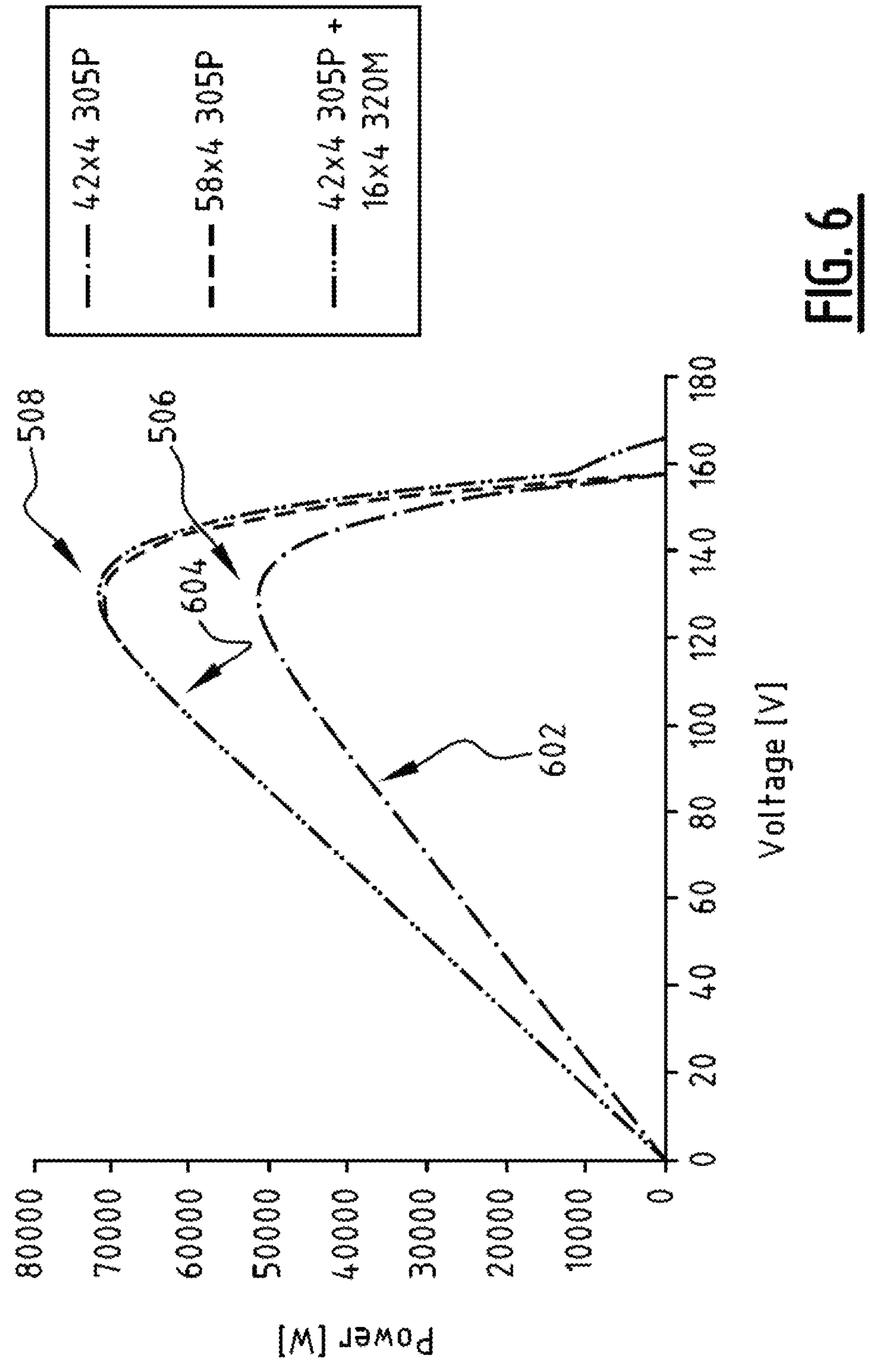
FIG. 6 is an exemplary graph depicting the Voltage/Power curve of the undersized PV installation of FIG. 2 and the oversized PV installation of FIG. 3.

As can be seen in FIGS. 5 and 6, both MPP 506 and MPP 508 correspond to a similar voltage while the oversize curve 504 provides more current (I) and power than the undersize curve 502. PV modules tend to produce relatively constant voltage output even as the intensity of the sun changes, unless they are heavily shaded, which is typically note the case. It is predominantly the current (I) output that decreases as light intensity falls. With a relatively constant voltage output, the curves in FIGS. 5 and 6 demonstrate that once the nominal voltage a PV installation has been configured for a connected electrolysis equipment, the power and current (I) outputs of that PV installation can be controlled by through connecting (turning on or disconnecting (turning off) certain PV modules in the PV installation to increase or decrease, respectively, the power and current (I) being provided to the connected electrolysis equipment while still maintaining operation within rated specifications. As described in US20210079544, the PV installation may be designed to have a nominal voltage that is slightly higher than the rated voltage of a connected electrolysis equipment due to anticipated degradation of the PV installation over time.

According to one aspect, the present disclosure provides a method for providing electrical power from solar equipment to an electrical consumer. Referring to FIG. 1, there is provided a photovoltaic (PV) installation 102 comprising a first portion 112 and a second portion 114. PV installation 102 is directly connected to electrical consumer 104 to provide electrical power generated therefrom. As shown, PV installation comprises an electrical power output that has a certain current (I) amount (i.e., combined current (I) output 118) that can be measured by electrical measurement devices known to one of ordinary skill, such as amp meter 120.

Each of first and second portions, 112 and 114 respectively, comprises at least one PV string 108 in which there is one PV module 110 or a plurality of PV modules 110 connected with each other in series. If either portion 112 and/or 114 comprises two or more (plurality) PV strings 108, such as shown in FIG. 1, the plurality of strings 108 are connected to each other in parallel to form a PV array as known by one of ordinary skill. Preferably, as further described herein, first portion 112 (once connected to the electrical consumer) provides the majority of electrical power needs of the electrical consumer. On the other hand, second portion 114 is configured to be repeatedly connected to and disconnected from an electrical consumer 104, via a switching mechanism 116, to control the amount of electrical power from second portion 114 according to a certain threshold, which translates to enabling control of the overall amount of electrical power being provided to the electrical consumer from PV installation 102 according to this threshold. Accordingly, at least second portion 114 is capable of, preferably configured to, being repeatedly connected and disconnected as described herein, particularly via switching mechanism 116 (such as shown in FIG. 1). That is, it is understood that first portion 112 can have a switching mechanism to connect and disconnect it to and from the electrical consumer as needed, such as for maintenance or turning the system on and off for the day or other reasons as known by one of ordinary skill.

Electrical consumer 104 comprises a rated current and a rated power (both not shown). The first portion 112 comprises a first maximum power production point, which is in direct current (DC). The second portion comprises a second maximum power production point, also in DC. The manufacturer of a particular piece of solar equipment, such as PV modules, typically provide specifications to allow for performance curves (such as the I-V and power curves depicted in FIGS. 5 and 6) to be generated for a particular PV installation comprised of such solar equipment. As described above, such performance curves can be used to determine or calculate the maximum power production point of first portion 112 and second portion 114 to provide the first and second maximum power production points, respectively. It is understood that during operation, the actual current (I) output of PV installation 102 can fluctuate away from the MPP as weather conditions fluctuate.

The first maximum power production point is at least 60%, such as in a range from 60% to 120%, and more preferably in a range of 60% to 100%, of the rated power of the electrical consumer 104. That is, the first portion 112 is preferably undersized relative to electrical consumer 104 so additional PV modules can be connected to increase the current, and correspondingly power, as described herein. Broadly speaking, for locations where weather conditions tend to be cloudier and therefore less electricity production, the first maximum power production point is closer to or can be greater than the rated power of electrical consumer 104. Inversely, the first maximum power production point tends to be a lot less than the rated power of electrical consumer 104 for more sunny locations.

The maximum power production point of PV installation 102 (sum of the first and second maximum power production points) is at least 5% greater than the rated power of electrical consumer 104. The maximum power production point of PV installation 102 is preferably greater than the rated power of electrical consumer 104 by 30% to 40% and more preferably greater by 40% to 70%. In other words, PV installation 102 comprising first portion 112 and second portion 114 is oversized relative to electrical consumer 104, as described herein.

To decide whether at least a segment, such as either PV string 122A or 122B, from portion 114 should be connected or disconnected, it is determined whether the combined current (I) output 118 of PV installation 102 exceeds a threshold. Preferably, the threshold is in a range from 95% to 110% of the rated current of electrical consumer 104, such as 95%, 99%, 100%, 105 or 110% of the rated current. If it is determined that combined current (I) output 118 of PV installation 102 is below the threshold, then at least a segment of second portion 114 can be connected to electrical consumer 104 so that when electricity is generated by the now-connected segment, it can be provided to electrical consumer 104. If it is determined that combined current (I) output 118 of PV installation 102 exceeds the threshold, then at least a segment of second portion 114 can be disconnected from electrical consumer 104 so that any electrical power generated by the now-disconnected segment would not be provided to electrical consumer 104. The steps of determining whether combined current (I) output 118 exceeds the threshold, connecting at least a segment of the second portion if combined current (I) output 118 is below the threshold or disconnecting at least a connected segment of the second portion of combined current (I) output 118 is above the threshold can be continuously repeated to maintain the current (I) output of PV installation 102 within a range of the threshold.

The segment of second portion 114 of PV installation 102 to be connected or disconnected preferably can be selected from the group consisting of a PV module, a PV string, a PV array, and any combination thereof. For instance, the segment to be connected or disconnected can be one or more PV strings 108. Each string 108 of a segment can consist essentially of one PV module 110, a plurality of modules 110 connected in series, or any combination thereof, to achieve the desired electrical power output. FIG. 1 depicts second portion 114 as comprising segments 122A and 122B for illustrative purposes. It is understood that additional segments to be connected or disconnected can further include 122B, 122C, 122D, etc. (with 122C through 122Z and beyond, as applicable, not depicted but understood to be variations contemplated herein). As technology in solar equipment advances, the number, sizes, or other related specifications are expected to change and can suitably be adapted by one of ordinary skill. Optionally, each segment of the second portion being connected or disconnected has a current (I) capacity of 1%-15%, preferably 1%-5%, and more preferably 1%-2%, of the total current (I) capacity of the PV installation. For instance, the current (I) capacity of segments 122A and 122B may each be 1% of total current (I) capacity of PV installation 102, while segments 122C and 122D (not shown) are 2%, 122E and 122F (not shown) are 5%, and so on, up to 15%.

Suitably, a signal is sent to switching mechanism 116 to perform the respective connecting step or disconnecting step. Optionally, switching mechanism 116 is an electrical switching mechanism. Preferably, switching mechanism 116 comprises one or more solid state relays (SSRs), more preferably at least one SSR is, and most preferably two SSRs (one for each +/−potential difference for electron flow) are, connected to each segment that is being connected or disconnected.

Solid state relays or solid state switches are known to one of ordinary skill. For instance, generally speaking, an SSR serves the same function as an electromechanical relay, but it has no moving parts. SSRs consist essentially of a sensor which responds to an appropriate input (control signal), a solid-state electronic switching device which switches power to the load circuitry, and a coupling mechanism to enable the control signal to activate this switch without mechanical parts. The relay may be designed to switch either AC or DC loads. Solid state relays are commercially available with rated specifications ranging from just a few volts or amperes to many hundreds of volts and amperes of output switching capability, which can be suitably selected by one of ordinary skill. Non-exclusive examples of suitable SSRs include insulated-gate bipolar transistor (IGBT) and metal-oxide-semiconductor field-effect transistor (MOSFET).

As known to one of ordinary skill, various electrical measurement equipment can be placed between PV installation 102 and electrical consumer 104 to facilitate the methods and systems described herein. In addition, also known to one of ordinary skill is the use of a computer program or advanced control logic to receive inputs from the various electrical measurement devices for analysis and implementation of at least the connecting and disconnecting steps by send the appropriate signal to the relevant switching mechanism(s).

The computer program for controlling various components described herein, including implementing the connecting and disconnecting steps may be referred to as a controller, depicted as controller 124 in FIG. 5. Controller 124 can be any suitable computer program for carrying out applicable steps of the methods described herein when the computer program is executed by a data processor. As used herein, reference to a computer program is intended to be equivalent to a reference to a program element and/or a computer readable medium containing instructions for controlling a computer system to coordinate the performance of the methods described herein. The computer program (or logic solver) may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded. The various aspects described herein may be realized by means of a computer program respectively software; however, they may also be realized by means of one or more specific electronic circuits respectively hardware. Furthermore, the invention may also be realized in a hybrid form, i.e. in a combination of software modules and hardware modules. Suitably, controller 124 can comprise a distributed control system (DCS) or a PLC type (Programmable Logic Controllers) of controller.

Optionally, at least one electrical current measuring device (such as an amp meter) 120 can be connected to an output of PV installation 102 to assist controller 124 with determining whether combined current (I) output 118 of PV installation 102 is below a threshold, which can be set or programmed into controller 124 by a user. The threshold can be anything a user selected, which preferably in this case is tied to a rated specification of electrical consumer 104 as noted elsewhere in this disclosure. There can be another electrical current measuring device 126 connected to an output of each segment (such as 122A, 122B, etc.) of second portion 114 to help determine the current output of each segment, which can help with the optional selective disconnecting as further described below. During the start-up of system 100, before current starts flowing from PV installation 102 to electrical consumer 104, it is not yet possible for amp meter 120 to measure current (I) output 118. Before connecting PV installation 102 to electrical consumer 104 to allow the current (I) to flow, it is preferable to determine whether the current (I) available from PV installation 102 is above the minimum level needed to operate electrical consumer 104 before proceeding with the connection. This is preferred because if the available current is not above the minimum level for operation and PV installation 102 is turned on anyways to provide current, the hydrogen and oxygen in the electrolysis equipment have more time to diffuse through the membrane in the electrolyser cell(s) and can form an explosive mixture. One suitable option to estimate the available current (I) from PV installation 102 during start-up is to use irradiance sensor 128 to measure the irradiance using calculations known to one of ordinary skill. For instance, prior to connecting the first portion of PV installation 102 irradiance sensor 128 After the current (I) is flowing, the methods can be implemented as described herein, such as those described with respect to FIG. 7.

Figure 7:
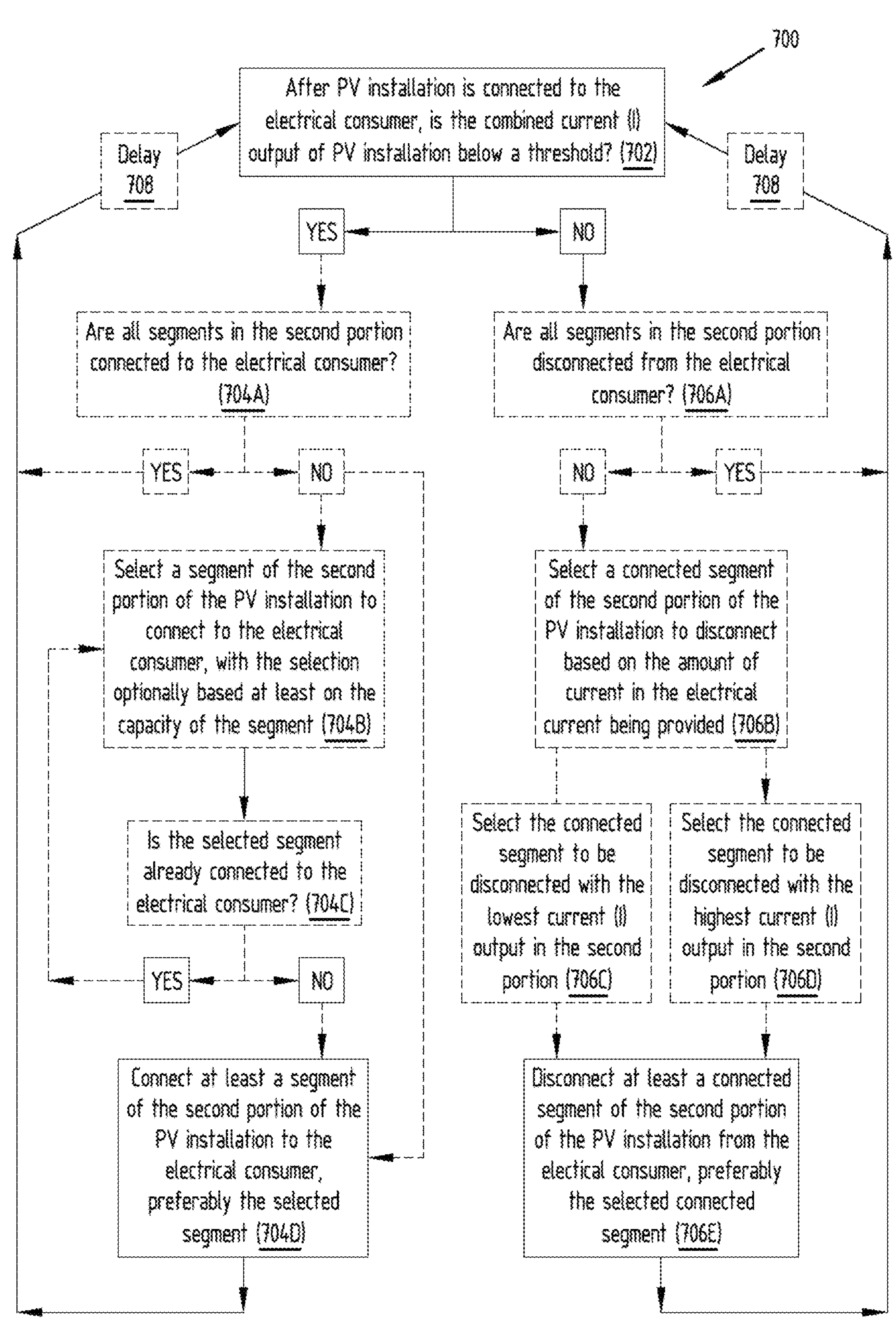
FIG. 7 is an exemplary process flow according to aspects described herein to operate exemplary systems such as those depicted in FIG. 1 and FIG. 8.

FIG. 7 is herein referenced to provide further clarifications and context around how one or more segments (e.g., 122A, 122B, etc.) of second portion 114 can be connected and disconnected, such as via controller 124. Referring to FIG. 7, at step 702, it is determined whether the current (I) output of the PV installation (such as current output 118) is below a threshold. Referring to FIG. 7, this step is preferably performed by controller 124 at least by comparing the current (I) reading of PV installation 102 as measured by current (I) measurement device 120 with the selected threshold, which is preferably the rated current of electrical consumer 104. Referring to FIG. 7, if the response is affirmative that the current (I) output is below the threshold, then the process can proceed directly to step 704D to connect at least a segment (e.g., 122A) of the second portion (e.g., 124) to the electrical consumer (e.g., 104). If the response is negative that the current (I) output is above or exceeds the threshold, then the process can proceed to step 706 to disconnect at least a connected segment (e.g., 122A) of the second portion (e.g., 124) to the electrical consumer (e.g., 104).

Optionally, referring to FIG. 7, the step of connecting a segment (such as step 704D) preferably comprises optional step 704A, optional step 704B, optional step 704C, or any combination thereof to selectively selecting a particular segment of the second portion, rather than any segment, to connect to the electrical consumer, which may be referred to as "selectively connecting." For instance, before step 704D is performed and a segment is connected to the electrical consumer (such as via a signal being sent from controller 124 to switching mechanism 116), it can be determined whether all segments in the second portion of the PV installation are already connected to the electrical consumer. This step is preferably performed by controller 124. If the response is affirmative that all the segments are already connected, then process 700 is repeated starting with step 702. If the response is negative that not all the segments are connected to the electrical consumer, then the process can either proceed directly to step 704D to connect at least one segment or proceed to optional step 704B where a particular segment is selected for connection. This can be done by means known to one of ordinary skill. For instance, the various segments in the second portion of the PV installation and their respective switching mechanism(s) can be defined or named and programmed in the controller (e.g., 124) such that each segment can be methodically selected for connection (such as, segment A being selected first, then segment B, then segment C, etc.). Optionally, another suitable selective selection protocol can include selecting segments based at least on its output capacity, such as ones with higher current output capacity (such as around 10%) first then move to lower current output capacity (such as around 1%) or vice versa. While not shown in FIG. 7 and not preferred, it is also understood that step 704A can be skipped where the process proceeds from step 702 to step 704B of selecting a segment for connection as described herein. Preferably, a segment that is connected in one instance ("turned on) is not then selected to be disconnected ("turned off") immediately after.

Once selected, it can be determined at step 704C whether the selected segment is already connected to the electrical consumer. If the response is affirmative that the selected segment is already connected, then the process goes back to step 704B so another segment can be selected for connection with the electrical consumer. Steps 704B and step 704C are repeated until a segment available for connection is found, which results in the negative response that the selected segment is not already connected and the process can proceed to step 704D in which the selected segment is connected.

Optionally, the step of disconnecting a connected segment (such as step 706) preferably comprises selecting a particular connected segment of the second portion, rather than any connected segment, to disconnect from the electrical consumer, which may be referred to as "selectively disconnecting." Referring to FIG. 7, the selective disconnecting can comprise optional step 706A, optional step 704B, optional step 706C, optional step 706D, or any combination thereof. For instance, before step 706 is performed and a segment is disconnected from the electrical consumer (such as via a signal being sent from controller 124 to switching mechanism 116), it can be determined whether all segments in the second portion of the PV installation are already disconnected from the electrical consumer. This step is preferably performed by controller 124. If the response is affirmative that all the segments are already disconnected, then process 700 is repeated starting with step 702. If the response is negative that not all the segments are disconnected from the electrical consumer, then the process can either proceed directly to step 706E to disconnect at least one connected segment or proceed to optional step 706B where a particular connected segment is selected for the disconnection. This can be done by means known to one of ordinary skill. For instance, with the various segments in the second portion of the PV installation and their respective switching mechanism(s) already defined or named and programmed in the controller (e.g., 124) as described above, each connected segment can be methodically selected for disconnection (such as, segment A being selected first, then segment B, then segment C, etc.). Preferably, as depicted in FIG. 7, the selection can be based on the amount of current in the electrical current being provided. For instance, at step 706E, a segment of the second portion providing the lowest current (I) output is selected to be disconnected from the electrical consumer. Alternatively, at step 706D, a segment of the second portion providing the highest current (I) output is selected to be disconnected from the electrical consumer.

The selection between step 706C can be done manually by a user and/or it can be programmed to be performed by the controller (e.g., 124) as desired by one of ordinary skill.

If step 706C is selected, the segment that produces the lowest current (in comparison with the other segments in the second portion) is disconnected or switched off first. This can allow for targeting a value for the total current (I) output of the PV installation to be as close as possible to the threshold, which can translate to higher productivity by the electrical consumer (such as hydrogen production yields if the electrical consumer includes electrolyzer(s)) as compared to disconnecting a segment that produces a higher current. The counterbalance to selecting the lowest current segment is the possibility of repeating process 700 to turn off multiple segments to bring the current (I) output of the PV installation below the threshold, which can take more time. On the other hand, if step 706D is selected, the segment that produces the highest current (in comparison with the other segments in the second portion) is disconnected first. This can allow for targeting fewer rounds of the process loop 700 to switch off or disconnect fewer segments to bring the total current (I) output of the PV installation to below the threshold, which can take less time than if other segments were selected. The counterbalance is the possibility of less output by the electrical consumer and/or additional switching activities to increase the current (I) output of the PV installation to close to the threshold.

Sensors, including electrical measurement devices, can be used to help determine which segment produces the lowest current or highest current. For instance, referring to FIG. 1, electrical measurement device (or amp meter) 126 connected to an output of segment 122A, preferably one amp meter connected to each segment, of second portion 114 can be used to provide current readings or measurements of that respective segment to controller 124 to perform steps 706C or 706D. The steps of determining whether the current (I) output exceeds the threshold, connecting at least a segment of the second portion if the current (I) output is below the threshold or disconnecting at least a connected segment of the second portion of the current (I) output is above the threshold can be continuously repeated to maintain combined current (I) output 118 of PV installation 102 within a range of the threshold. For instance, referring to FIG. 7, after either step 704D or 706E is performed, process loop 700 is repeated beginning with step 702. Optionally, process 700 further comprises a delay period (e.g., 708) before step 702 is performed. Preferably a delay period of at least 0.2 second, more preferably a delay period of at least 0.5 second, and most preferably a delay period of at least 1 second. By continuously repeating or running process 700, the total current (I) output 118 of the PV installation (such as PV installation 102) can be maintained around the threshold.

Preferably, electrical consumer 104 comprises electrolysis equipment, more preferably, electrical consumer 104 consists essentially of electrolysis equipment. Suitable electrolysis equipment is known to one of ordinary skill. The primary hydrogen generating component of electrolysis equipment is the electrolysis stack. The technology of the electrolysis stack is preferably selected from: acidic polymer electrolyte (Proton Exchange Membrane or PEM) based, anionic polymer electrolyte (Anionic Exchange Membrane or AEM) based, alkaline electrolysis with a diaphragm cell separator or high temperature systems with ceramic based electrolytes (solid oxide electrolyser, SOEC). An electrolysis stack contains a number of electrolysis cells, which are internally connected in series. The number of cells in the stack will vary by technology and may be expected to fall in the range of 20 to 1000 cells. The rated voltage of individual cells may be expected to be in the range 1.5-2.5V for an alkaline electrolyser, for example. Therefore, the individual electrolysis stack rated voltage would be expected to be from approximately 35V to in excess of 1500V.

With the currently available and future electrolysis stack technology, one of ordinary skill can select the suitable electrolysis equipment to design an electrolyzer system comprising one or more electrolysis stacks to meet the desired specifications, such as rated hydrogen production, power, current, voltage, or any combination thereof. Presently, the size of a water electrolyser stack directly coupled to a solar photovoltaic array may be limited by different factors. One example may be a practical limitation for the voltage and current desired on the direct coupled DC electrical connection. The water electrolysis system has a size of from at least 10 kW and up to at least 20 MW, which is expected to increase in the future as electrolysis technology advances. That is, the PV installation the PV installation can have a nominal power output of at least 1 MW, preferably at least 5 MW, more preferably at least 10 MW, and most preferably at least 20 MW.

For instance, if it is desired to design system 100 to operate at 20 MW then a suitable number of PV equipment (modules, strings, arrays, etc.) can be configured as known by one of ordinary skill to reach the 20 MW nominal power output. Such a PV installation is preferably directly connected to an electrolysis system with a rated power of 20 MW. All current generated by the PV installation needs to be used up by a connected electrical consumer or the excess is stored to maintain steady state operation of the system. In such case, the PV installation comprises a first portion (e.g., 112) with the first maximum power production point of at least 60%, preferably in a range from 60% to 120%, and more preferably in a range of 60% to 100%, of the rated power of 20 MW of electrical consumer 104, which is the electrolysis system in this instance. At least the second portion is configured to be connected to or disconnected from the electrolysis system to provide or discontinue providing current in addition to the current being provided by the first portion. Also in this case, the sum of the first and second maximum power production points is at least 5%, preferably in a range from 30% to 40%, and more preferably from 40% to 70%, greater than the rated power of the electrical consumer of 20 MW.

Figure 8:
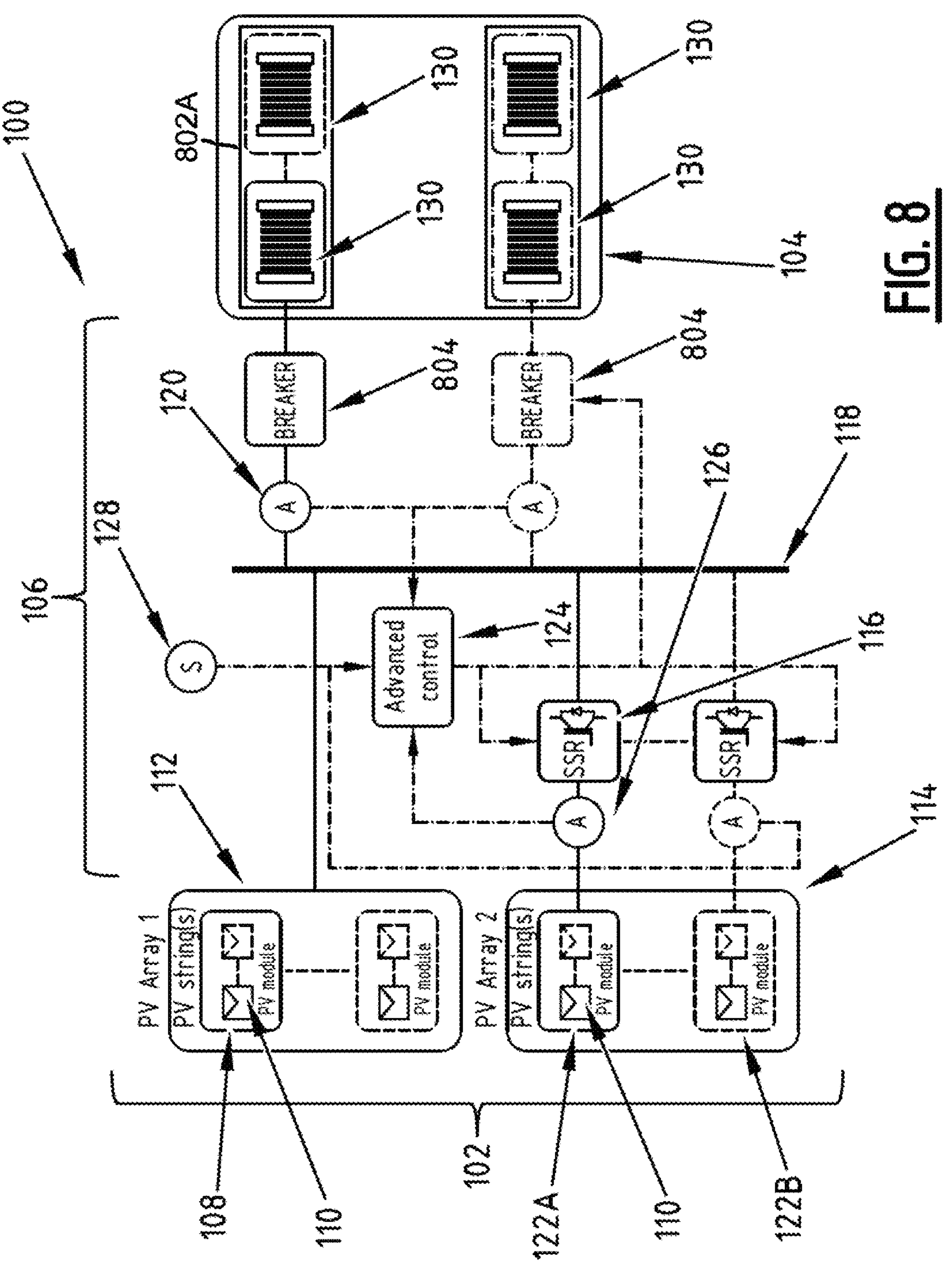
FIG. 8 illustrates another exemplary system of a PV installation directly connected to an electrical consumer, such as more than one sets of electrolysis equipment, which system can be operated according to aspects described herein, including the exemplary process flow depicted in FIG. 7 and corresponding descriptions.

The design of large-scale (20 kW to multi-GW scale) solar photovoltaic directly coupled electrolyser systems may be defined as requiring two or more repeat units of system 100 operating at 20 MW, which are connected in series as shown in FIG. 1. Alternatively, two or more repeat units which may be smaller than such 20 MW configuration such as shown in FIG. 8, or any suitable permutation that can be designed by one of ordinary skill to deliver the desired amount of hydrogen product.

That is, a number of electrolysis stacks 130 can be connected in series to meet the 20 MW electrolysis system. As shown in FIG. 1, at least two electrolysis stacks 130 are connected in series. However, it is understood that three, four, five, six, seven, eight, nine, ten, or more electrolysis stacks 130 can be connected in series. Another option for configuring system 100 is shown in FIG. 8, which shows consumer 104 with at least two electrolysis systems 802A and 802B connected in parallel with one another to receive combined current (I) output 118 of PV installation 102. Each electrolysis system 802A or 802B includes at least two or more electrolysis stacks 130 connected in series. While FIG.

8 shows two electrolysis systems 802A and 802B, it is understood that there can be more than two (802C, 802D (not shown), so on). As shown in FIG. 8, each of electrolysis systems 802A and 802B can have a breaker 804 connected to it to allow control of current flow as needed or desired. It is understood that one of ordinary skill in the art would know how to calculate the rated power, rated current, and rated voltage (which expects to remain relatively constant as described herein) of the selected configurations in applying the methods and systems described herein.

Accordingly, the systems and methods described herein enables for an electrical consumer, particularly one that consumes large-scale amount of electrical power (such as rated power of at least one gigawatt), including large-scale electrolysis equipment to be directly connected to PV equipment to receive electrical power to produce hydrogen, including without being connected to a utility grid to receive electrical power for hydrogen production.

While specific embodiments have been described herein, it is understood that such descriptions are not intended to limit the described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

We claim:

1. A method for directly providing electrical power from a photovoltaic (PV) installation to an electrical consumer, wherein the electrical consumer comprises electrolysis equipment, the method comprising:

(a) providing electrical power generated by a PV installation via a direct connection to an electrical consumer wherein the electrical consumer comprises a rated current and a rated power,
  wherein the direct connection is a connection without any conversion equipment between the PV installation and the connected electrical consumer to change the current, voltage, or the current (direct vs. alternating) of the electrical power being provided,
  wherein the PV installation comprises a first portion and a second portion,
  wherein each of the first portion and the second portion comprises at least one PV string;
  wherein the first portion comprises a first maximum power production point of at least 60% of the rated power of the electrical consumer,
  wherein the second portion comprises a second maximum power production point such that the sum of the first and second maximum power production points is at least 5% greater than the rated power of the electrical consumer;
(b) determining whether current (I) output of the PV installation is below a threshold; and
(c) if it is determined that the current (I) output of the PV installation is below the threshold, connecting at least one segment of the second portion of the PV installation to the electrical consumer to allow any generated electrical power to be provided; or
(d) if it is determined that the current (I) output of the PV installation exceeds the threshold, disconnecting at least a connected segment of the second portion of the PV installation from the electrical consumer to stop electrical power from being provided; and
(e) repeating steps (b) through (d) to maintain the current (I) output of the PV installation within a range of the threshold.

2. The method of claim 1, wherein the segment of the second portion of the PV installation being connected or disconnected is selected from the group consisting of a PV module, a PV string, a PV array, and any combination thereof.

3. The method of claim 1, wherein each segment of the second portion being connected or disconnected has a current (I) capacity of 1% to 15% of the total current (I) capacity of the PV installation.

4. The method of claim 1, wherein steps (c) and (d) comprise sending a signal to the switching mechanism to perform the respective connecting step or disconnecting step.

5. The method of claim 4, wherein the switching mechanism is an electrical switching mechanism.

6. The method of claim 1, wherein the threshold is in a range from 95% to 110% of the rated current of the electrical consumer.

7. The method of claim 1, wherein the step of connecting at least a segment of the second portion comprises selectively connecting at least by:

(d1) determining whether all segments in the second portion are connected to the electrical consumer;
(d2) if it is determined that all segments in the second portion are connected to the electrical consumer, repeating steps (b)-(d); or
(d3) if it is determined that not all segments in the second portion are connected to the electrical consumer, connecting at least a segment of the second portion to the electrical consumer.

8. The method of claim 7, wherein the selectively connecting further comprises:

(d3i) selecting a segment of the second portion to connect with the electrical consumer;
(d3ii) determining whether the selected segment is already connected to the electrical consumer;
(d3iii) if it is determined that the selected segment is already connected to the electrical consumer, selecting another segment of the second portion; or
(d3iv) if it is determined that the selected segment is not connected to the electrical consumer, connecting the selected segment to the electrical consumer;
(d3v) repeating steps (d3i)-(d3iii) for all segments of the second portion; and
(d3vi) repeating steps (b)-(d) after steps (d3i)-(d3iii) have been performed for all segments of the second portion.

9. The method of claim 1, wherein the step of disconnecting a connected segment of the second portion comprises selectively disconnecting at least by:

(e1) determining whether all segments in the second portion are disconnected from the electrical consumer;
(e2) if it is determined that all segments in the second portion are disconnected from the electrical consumer, repeating steps (b)-(d); or
(e3) if it is determined that a segment of the second portion is connected to the electrical consumer, disconnecting the connected segment of the second portion from the electrical consumer.

10. The method of claim 9, wherein selectively disconnecting further comprises:

(e3i) selecting a connected segment of the second portion to disconnect from the electrical consumer based on the amount of current being provided by that connected segment.

11. The method of claim 1, further comprising a delay period before step (b) is performed.

12. The method of claim 1, wherein the electrical consumer comprises two or more sets of electrolysis equipment in parallel.

13. The method of claim 1, wherein the PV installation has a nominal power output of at least 1 MW.

14. The method of claim 1, further comprising the steps of estimating the available current of the PV installation and connecting the PV installation to the electrical consumer if the estimated available current is above a minimum operating current of the electrical consumer.

15. The method of claim 1, wherein the electrical consumer comprises electrolysis equipment and does not receive electrical power from an electrical grid to generate hydrogen.

16. The method of claim 1, wherein the electrical consumer consists essentially of electrolysis equipment.

17. The method of claim 1, wherein the first portion comprises a first maximum power production point in a range from 60% to 120% of the rated power of the electrical consumer.

18. The method of claim 1, wherein the second portion comprises a second maximum power production point such that the sum of the first and second maximum power production points is in a range from 30% to 40% greater than the rated power of the electrical consumer.

19. The method of claim 1, wherein each segment of the second portion being connected or disconnected has a current (I) capacity of 1% to 5% of the total current (I) capacity of the PV installation.

20. The method of claim 4, wherein the switching mechanism is an electrical switching mechanism comprising one or more solid state relays (SSRs).

* * * * *